United States Patent
Roytman et al.

(10) Patent No.: US 11,861,016 B2
(45) Date of Patent: *Jan. 2, 2024

(54) MULTI-STAGE TRAINING OF MACHINE LEARNING MODELS

(71) Applicant: KENNA SECURITY LLC, Chicago, IL (US)

(72) Inventors: Michael Roytman, Chicago, IL (US); Jay Jacobs, St. Paul, MN (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/223,675

(22) Filed: Apr. 6, 2021

(65) Prior Publication Data
US 2021/0248243 A1 Aug. 12, 2021

Related U.S. Application Data

(63) Continuation of application No. 16/103,750, filed on Aug. 14, 2018, now Pat. No. 10,970,400.

(51) Int. Cl.
*G06F 21/57* (2013.01)
*G06N 20/00* (2019.01)
*G06N 7/01* (2023.01)

(52) U.S. Cl.
CPC ............ *G06F 21/577* (2013.01); *G06N 7/01* (2023.01); *G06N 20/00* (2019.01); *G06F 2221/033* (2013.01)

(58) Field of Classification Search
CPC ... H04L 63/1433; H04L 63/14; G06F 21/577; G06F 21/57; G06N 20/00; G06N 20/10; G06N 20/20
See application file for complete search history.

(56) References Cited

U.S. PATENT DOCUMENTS

| | | | | |
|---|---|---|---|---|
| 7,647,637 B2* | 1/2010 | Schuba | | H04L 63/20 726/25 |
| 7,958,113 B2* | 6/2011 | Fan | | G06F 16/24545 707/718 |
| 8,595,845 B2* | 11/2013 | Basavapatna | | H04L 63/1408 713/168 |

(Continued)

FOREIGN PATENT DOCUMENTS

WO   WO 2018/073646 A1   4/2018

OTHER PUBLICATIONS

Wikipedia, "Training, Validation and Test Sets", https://en.wikipedia.org/w/index.php?title=Training,_validation,_and_test_sets&oldid=849707937, last viewed on Mar. 24, 2020, 5 pages.

(Continued)

*Primary Examiner* — Zachary A. Davis
(74) *Attorney, Agent, or Firm* — Baker Botts L.L.P.

(57) ABSTRACT

Generation of a first prediction model is caused based on first training data, where the first prediction model enables determining whether an exploit to be developed for software vulnerabilities will be used in an attack. For each training instance in the first training data, the first prediction model is used to generate a score. Each training instance is added to second training data if the score is greater than a threshold value. The second training data is a subset of the first training data. Generation of a second prediction model is caused based on the second training data, where the second prediction model enables determining whether an exploit to be developed for software vulnerabilities will be used in an attack.

18 Claims, 4 Drawing Sheets

(56) References Cited

U.S. PATENT DOCUMENTS

| | | | | |
|---|---|---|---|---|
| 9,818,142 | B2* | 11/2017 | Wang | G06F 16/24578 |
| 10,063,406 | B2* | 8/2018 | Tapia | H04L 41/0631 |
| 10,063,582 | B1* | 8/2018 | Feng | G06F 21/575 |
| 10,114,954 | B1* | 10/2018 | Bellis | G06F 21/577 |
| 10,264,009 | B2* | 4/2019 | Smyth | G06N 7/005 |
| 10,303,978 | B1* | 5/2019 | Kang | G06F 16/3329 |
| 10,387,655 | B2* | 8/2019 | Copty | G06N 7/023 |
| 10,970,400 | B2* | 4/2021 | Roytman | G06N 20/20 |
| 2017/0032130 | A1* | 2/2017 | Joseph Durairaj | H04L 41/16 |
| 2017/0214710 | A1* | 7/2017 | Seiver | H04L 63/10 |
| 2018/0034842 | A1* | 2/2018 | Smyth | G06N 7/005 |
| 2018/0039911 | A1* | 2/2018 | Bezzubtseva | G06N 20/00 |
| 2018/0136921 | A1* | 5/2018 | Pfleger de Aguiar | H04L 63/1433 |
| 2019/0052665 | A1* | 2/2019 | Mahieu | G06N 3/04 |
| 2019/0215330 | A1* | 7/2019 | Neuvirth | H04L 63/1425 |
| 2020/0057857 | A1 | 2/2020 | Roytman | |

OTHER PUBLICATIONS

Wikipedia, "Supervised Learning", https://en.wikipedia.org/w/index.php?title=Supervised_learning&oldid=853350934, last edited on Aug. 4, 2018, 7 pages.

Wikipedia, "Precision and Recall", https://en.wikipedia.org/w/index.php?title=Precision_and_recall&oldid=853202943, last viewed on Mar. 24, 2020, 7 pages.

Wikipedia, "Feature (Machine Learning", https://en.wikipedia.org/w/index.php?title=Feature_(machine_learning)&oldid=832795754, last viewed on Mar. 24, 2020, 3 pages.

Roytman, U.S. Appl. No. 16/103,750, filed Aug. 14, 2019, Final Office Action, dated Sep. 20, 2019.

Roytman, U.S. Appl. No. 16/103,750, filed Aug. 14, 2018, Office Action, dated Feb. 26, 2019.

Roytman U.S. Appl. No. 16/103,750, filed Aug. 14, 2018, Office Action, dated Dec. 27, 2019.

* cited by examiner

FIGURE 2

| | PREVALENCE FEATURE 216 | DEVELOPED EXPLOIT FEATURE 218 | EXPLOIT DEVELOPMENT TIME FEATURE 220 | ATTACK FEATURE 222 | SCORE FEATURE 224 |
|---|---|---|---|---|---|
| SOFTWARE VULNERABILITY 200 | 2,000,000 | YES | 7 | 25 | 95 |
| SOFTWARE VULNERABILITY 202 | 1,750,000 | YES | 14 | 18 | 92 |
| SOFTWARE VULNERABILITY 204 | 1,500,000 | NO | NULL | NULL | 61 |
| SOFTWARE VULNERABILITY 206 | 1,250,000 | YES | 30 | 12 | 88 |
| SOFTWARE VULNERABILITY 208 | 1,000,000 | NO | NULL | NULL | 50 |
| SOFTWARE VULNERABILITY 210 | 750,000 | NO | NULL | NULL | 47 |
| SOFTWARE VULNERABILITY 212 | 500,000 | YES | 60 | 5 | 83 |
| SOFTWARE VULNERABILITY 214 | 250,000 | NO | NULL | NULL | 34 |

MULTI-STAGE TRAINING OF MACHINE LEARNING MODELS

BENEFIT CLAIM

This application claims benefit under 35 U.S.C. § 120 as a Continuation of application Ser. No. 16/103,750 filed Aug. 14, 2018, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

CROSS-REFERENCE TO RELATED APPLICATIONS

This application is related to application Ser. No. 15/827,943, filed Nov. 30, 2017 the entire contents of which is hereby incorporated by reference as if fully set forth herein.

FIELD OF THE DISCLOSURE

The present disclosure relates generally to security of computing devices. More specifically, the present disclosure relates to techniques for exploit prediction using machine learning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software vulnerabilities are weaknesses or flaws in computational logic. As used herein, the term "software" also refers to firmware, operating systems, applications, and programs. When exploited, a vulnerability can facilitate unauthorized access to a computing device, enable an attack to remain undetected, permit unauthorized modification of data, reduce the availability of data, and/or the like. An attempt to exploit or take advantage of a vulnerability is referred to herein as an attack, and a successful attack results in what is hereinafter referred to as a breach.

Often, programs are developed to exploit vulnerabilities. Such programs are referred to herein as exploits. For example, a particular vulnerability affecting Linux® operating system kernel versions through 3.14.5 failed to ensure that system calls had two different fast userspace mutex ("futex") addresses. An exploit known as Towelroot took advantage of this vulnerability to gain root access to devices using the Android™ operating system.

Vulnerabilities can be remediated using patches, version upgrades, and/or the like. Due to resource constraints, however, not all vulnerabilities can be remediated at the same time. Thus, remediation of vulnerabilities is typically prioritized according to different levels of risk posed by different vulnerabilities. For example, some vulnerabilities may never have exploits developed for them, and some exploits may never be used in an attack. Accordingly, remediation may be prioritized in the following order: (1) vulnerabilities having exploits that have been used in attacks, (2) vulnerabilities having exploits that have not been used in attacks, and (3) vulnerabilities not having any exploits.

However, waiting for exploits to be developed and for attacks to occur exposes computing assets to a significant amount of risk. Thus, it would be beneficial to be able to predict whether an exploit will be developed for a particular vulnerability and, if so, whether the exploit will be used in an attack.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Introduction
2.0 Structural and Functional Overview
3.0 Process Overview
4.0 Hardware Overview

1.0 INTRODUCTION

The embodiments disclosed herein are related to exploit prediction based on machine learning. One or more machine learning computers may be used to generate a prediction of whether an exploit will be developed for a particular vulnerability and/or a prediction of whether an exploit to be developed for a particular vulnerability will be used in an attack. As used herein, a prediction of "whether" an event will occur may also include more specific information about the event, such as when the event will occur, how many times the event will occur, the probability or likelihood that the event will occur, and/or the like.

A separate system may interact with the one or more machine learning computers to provide training and input data as well as to receive output data comprising predictions. The system comprises storage media, one or more processors, and one or more programs stored in the storage media and configured for execution by the one or more processors.

The system provides, to the one or more machine learning computers, training data with which to generate one or more predictive models. The training data may comprise one or more features corresponding to vulnerabilities that have been selected for training the one or more machine learning computers.

The one or more predictive models may include a classification model, a linear regression model, and/or the like. Thus, the one or more predictive models may establish a correlation between the one or more features and whether an exploit will be developed for a particular vulnerability and/or whether an exploit to be developed for a particular vulnerability will be used in an attack. In some embodiments, the correlation is established using a subset of the training data that corresponds to vulnerabilities for which exploits have already been developed.

In an embodiment, the system provides first training data with which to generate a first predictive model. The training data comprises a first plurality of vulnerabilities that have been selected for training the first predictive model. First output data is generated based on applying the first predictive model to the first training data. Based on the first output data, a selected set of the first training data is provided to one or more machine learning computers to train a second predictive model. The selected set may comprise vulnerabilities of the first plurality of vulnerabilities that were indicated by the first output data to be likely (a) to have an exploit developed for them and/or (b) that an exploit to be developed will be used in an attack.

The system also provides, to the one or more machine learning computers, input data that comprises the one or more features. The one or more features correspond to a second plurality of vulnerabilities that do not yet have exploits developed for them. In some embodiments, the input data also comprises one or more predictions generated by the one or more machine learning computers. For example, the input data may comprise a prediction that a particular vulnerability will have an exploit developed for it, a prediction that an exploit will be developed for a particular vulnerability within a particular number of days of publishing the particular vulnerability, and/or the like. In an embodiment, based on output data generated by applying a first predictive model to a set of input data, a subset of the input data is selected. The second predictive model is applied to the selected subset of input data.

The system receives, from one or more machine learning computers, output data generated based on applying one or more predictive models to the input data. For example, the system receives output data generated by applying the first predictive model and/or the second predictive model. The output data indicates which of the second plurality of vulnerabilities is predicted to have exploits developed for them; when, if ever, exploits are predicted to be developed for them; and/or which of the second plurality of vulnerabilities is predicted to be attacked. In some embodiments, the output data comprises predicted values of one or more of the aforementioned features, such as the developed exploit feature, the exploit development time feature, and/or the successful/unsuccessful attack features.

2.0 STRUCTURAL AND FUNCTIONAL OVERVIEW

Figure 1:
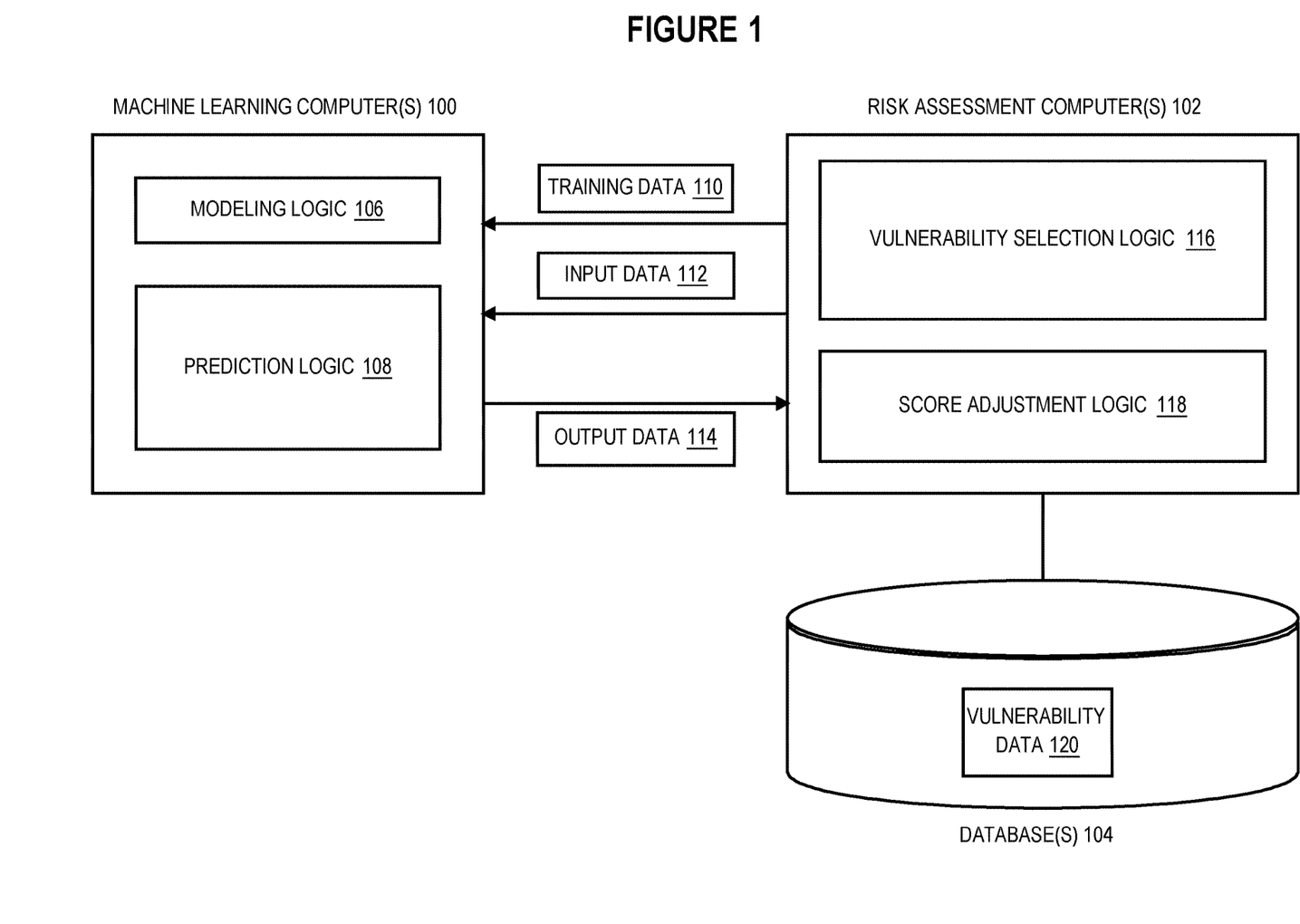
FIG. 1 is a block diagram that depicts an example computer architecture on which embodiments may be implemented.

Referring to the example embodiment of FIG. 1, machine learning computer(s) 100 are communicatively coupled to a system comprising risk assessment computer(s) 102 and database(s) 104. Although not explicitly depicted in FIG. 1, a network connection typically separates machine learning computer(s) 100 from the system. Machine learning computer(s) 100 and the system may reside on the same network or on different networks. For example, machine learning computer(s) 100 may provide a cloud-based service, such as a machine learning product provided by the Amazon Web Services™ cloud computing platform.

Figure 3:
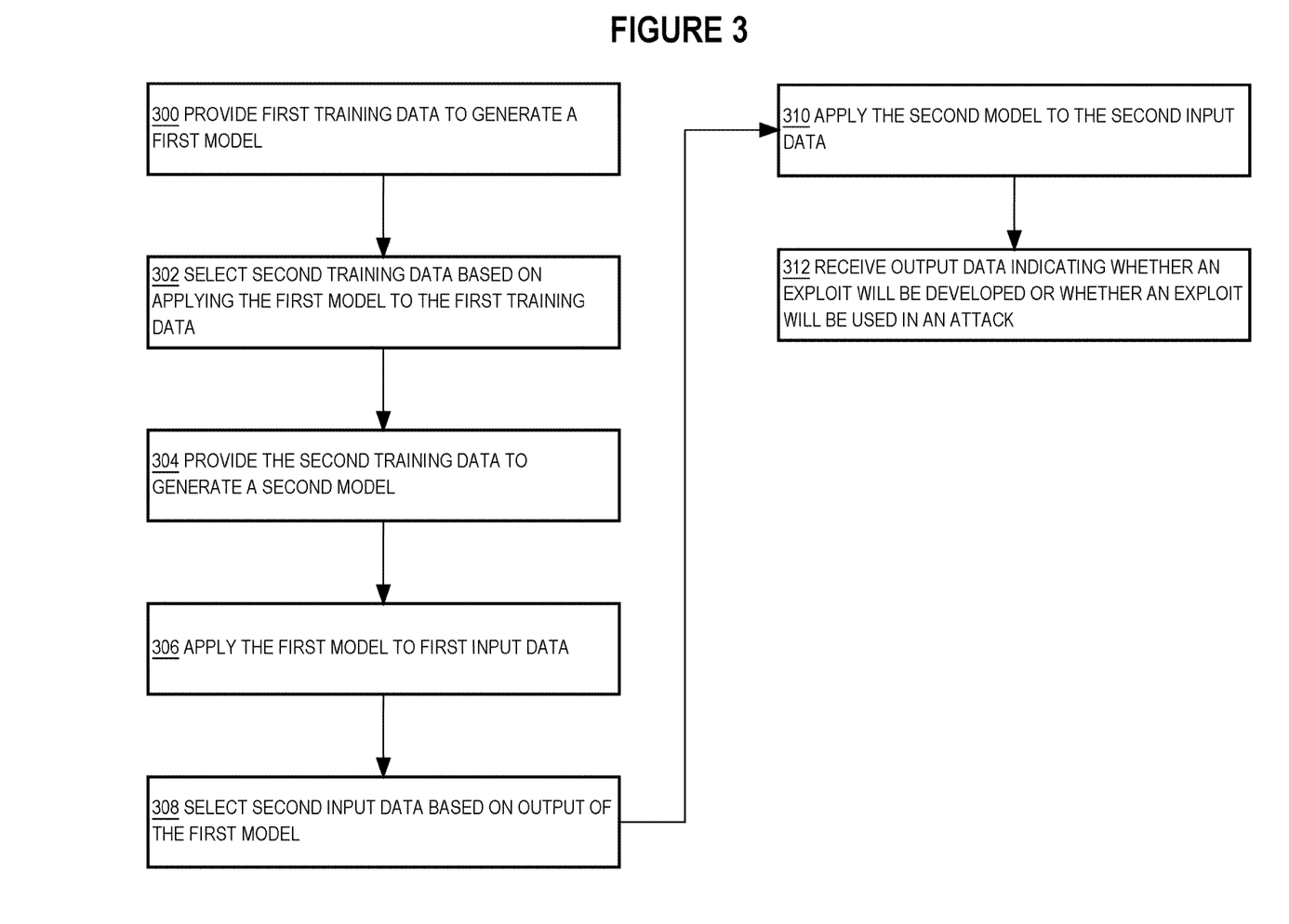
FIG. 3 is a flow diagram that depicts an approach for exploit prediction based on multi-stage machine learning.

Each of the logical and/or functional units depicted in the figures or described herein may be implemented using any of the techniques further described herein in connection with FIG. 3. While the figures include lines that indicate various devices and/or logical units being communicatively coupled, each of the systems, computers, devices, storage, and logic may be communicatively coupled with each other.

As used herein, a "computer" may be one or more physical computers, virtual computers, and/or computing devices. For example, a computer may be a server computer; a cloud-based computer; a cloud-based cluster of computers; a virtual machine instance or virtual machine computing elements such as a virtual processor, storage, and memory; a data center; a storage device; a desktop computer; a laptop computer; a mobile device; and/or the like. A computer may be a client and/or a server. Any reference to "a computer" herein may mean one or more computers, unless expressly stated otherwise.

2.1 Machine Learning Computer(s)

As mentioned above, machine learning is used to generate a plurality of prediction models that are used to predict whether an exploit will be developed for a particular vulnerability and/or whether an exploit to be developed for a particular vulnerability will be used in an attack. Machine learning is a subfield of computer science that evolved from the study of pattern recognition and computation learning theory in artificial intelligence. Machine learning explores the study and construction of algorithms that can learn from and make predictions based on data. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is infeasible. Example applications include spam filtering, optical character recognition (OCR), search engines, and computer vision.

Within the field of data analytics, machine learning is a method used to devise complex models and algorithms that lend themselves to prediction. These analytical models allow researchers, data scientists, engineers, and analysts to produce reliable, repeatable decisions and results as well as to uncover hidden insights through learning from historical relationships and trends in the data.

Any machine learning technique may be used to generate the one or more prediction models. Examples of machine learning algorithms include random forest, decision tree learning, association rule learning, artificial neural network, support vector machines, and/or Bayesian networks. Embodiments are not limited to any particular type of machine learning technique or algorithm.

Referring to FIG. 1, machine learning computer(s) 100 comprise modeling logic 106 and prediction logic 108. Machine learning computer(s) 100 receive training data 110 and input data 112 from risk assessment computer(s) 102, and machine learning computer(s) 100 send output data 114 to risk assessment computer(s) 102.

2.1.1 Modeling Logic

Modeling logic 106 processes training data 110 and implements one or more machine learning techniques to generate one or more prediction models. Training data 110 corresponds to a plurality of software vulnerabilities referred to herein as a "training set" of software vulnerabilities. More specifically, training data 210 comprises a number of features for each software vulnerability in the training set.

Any of a variety of prediction models can be used. Example prediction models include a binary classification model, a logistic regression model, a multiclass classification model, a multinomial logistic regression model, and/or a linear regression model.

In some embodiments, modeling logic 106 generates a prediction model for determining whether and/or when an exploit will be developed for a particular software vulnerability. Training data 110 may comprise a developed exploit feature and/or a developed exploit time feature for each software vulnerability in the training set. Training data 110 may further comprise one or more other features, such as one or more prevalence features, attack features, and/or the like. This enables modeling logic 106 to generate the prediction model based on the one or more other features.

In some embodiments, modeling logic 106 generates a prediction model for determining whether an exploit to be developed for a particular software vulnerability will be used in an attack. Training data 110 may comprise a developed exploit feature/developed exploit time feature and an attack feature. Training data 110 may further comprise one or more other features, such as one or more prevalence features. This enables modeling logic 106 to generate the prediction model based on the one or more other features.

2.1.2 Prediction Logic

Prediction logic 108 applies one or more prediction models to at least some of input data 112 to generate output data 114. Input data 112 corresponds to a plurality of software vulnerabilities that have yet to have an exploit developed for them. Output data 114 comprises predictions regarding the plurality of software vulnerabilities. In some embodiments, the predictions serve as features used to generate other predictions. In some embodiments, the predictions are used to adjust the risk scores of the plurality of software vulnerabilities.

For example, input data 112 may comprise a prevalence feature, but not a developed exploit feature/developed exploit time feature, for each software vulnerability of a plurality of software vulnerabilities. Prediction logic 108 may apply a prediction model for determining whether and/or when an exploit will be developed for a particular software vulnerability. Thus, values of a developed exploit feature/developed exploit time feature may be predicted. These values may be sent to risk assessment computer(s) 102 as output data 114 or at least some of these values may be used as input data for predicting values of an attack feature.

If predicted values of a developed exploit feature/developed exploit time feature are used as input data, prediction logic 108 may apply a prediction model for determining whether an exploit to be developed for a particular software vulnerability will be used in an attack. For example, if the predicted value of a developed exploit feature corresponds to "No", then the predicted value of an attack feature would also correspond to "No"; however, if the predicted value of a developed exploit feature corresponds to "Yes", then the predicted value of an attack feature may correspond to "Yes" or "No" depending on the values of other features, such as a prevalence feature. Thus, values of an attack feature may be predicted. These values may be sent to risk assessment computer(s) 102 as output data 114.

2.2 Risk Assessment System

In the example of FIG. 1, a risk assessment system comprises risk assessment computer(s) 102 and database(s) 104. Risk assessment computer(s) 102 is (are) communicatively coupled to database(s) 104.

2.2.1 Risk Assessment Computer(s)

Risk assessment computer(s) 102 comprise vulnerability selection logic 116 and score adjustment logic 118. Vulnerability selection logic 116 generates training data 110 and input data 112. Score adjustment logic 118 processes output data 114.

2.2.1.1 Vulnerability Selection Logic

Vulnerability selection logic 116 may generate training data 110 based on interacting with database(s) 104. More specifically, vulnerability selection logic 116 may determine which of the software vulnerabilities stored in database(s) 104 are to be included in a training set.

For example, to cause generation of a prediction model for determining whether and/or when an exploit will be developed for a particular software vulnerability, vulnerability selection logic 116 may include, in the training set, a plurality of software vulnerabilities, wherein each software vulnerability in the training set has a value for a developed exploit feature and/or a value for a developed exploit time feature. Additionally or alternatively, to cause generation of a prediction model for determining whether an exploit to be developed for a particular software vulnerability will be used in an attack, vulnerability selection logic 116 may include, in the training set, a plurality of software vulnerabilities, where each software vulnerability in the training set has values for a developed exploit feature/developed exploit time feature and an attack feature.

Vulnerability selection logic 116 also generates input data 112. In some embodiments, vulnerability selection logic 116 determines which of the software vulnerabilities stored in database(s) 104 do not yet have an exploit developed for them and includes one or more features for them in input data 112. For example, input data 112 may include recently published software vulnerabilities. When a prediction model for determining whether and/or when an exploit will be developed for a particular software vulnerability is applied to input data 112, machine learning computer(s) 100 generate(s) predictions as to whether and/or when exploits will be developed for the software vulnerabilities of input data 112. When a prediction model for determining whether an exploit to be developed for a particular software vulnerability will be used in an attack is applied to input data 112, machine learning computer(s) 100 generates predictions as to whether exploits to be developed for the software vulnerabilities of input data 112 will be used in attacks.

In some embodiments, vulnerability selection logic 116 generates input data based on a subset of predictions generated by machine learning computer(s) 100. For example, at time Ti, vulnerability selection logic 116 may include features of software vulnerabilities A-C in input data 112 to a first prediction model. At time T2, vulnerability selection logic 116 may receive output data 114 comprising predictions indicating that software vulnerabilities A and B, but not C, will have exploits developed for them. At time T3, vulnerability selection logic 116 may include features of software vulnerabilities A and B, but not C, in input data 112 to a second prediction model that is different than the first prediction model. Input data 112 may include predicted values for a developed exploit feature/developed exploit time feature. At time T4, risk assessment computer(s) 102 may receive output data 114 comprising predictions indicating whether software vulnerabilities A and B will have exploits developed for them that will be used in attacks.

2.2.1.2 Score Adjustment Logic

In an embodiment, score adjustment logic 118 modifies risk scores for software vulnerabilities based on output data 114. Modified risk scores may be stored in database(s) 104.

For example, software vulnerability A may be a recently published vulnerability having a risk score of seventy out of one hundred. If software vulnerability A is predicted to have an exploit developed for it, then the risk score may be increased to eighty. If the exploit is predicted to be used in an attack, the risk score may be increased to ninety. Additionally or alternatively, if no exploit is predicted to be developed for it, the risk score may be decreased to sixty.

2.2.2 Database(s)

Figure 2:
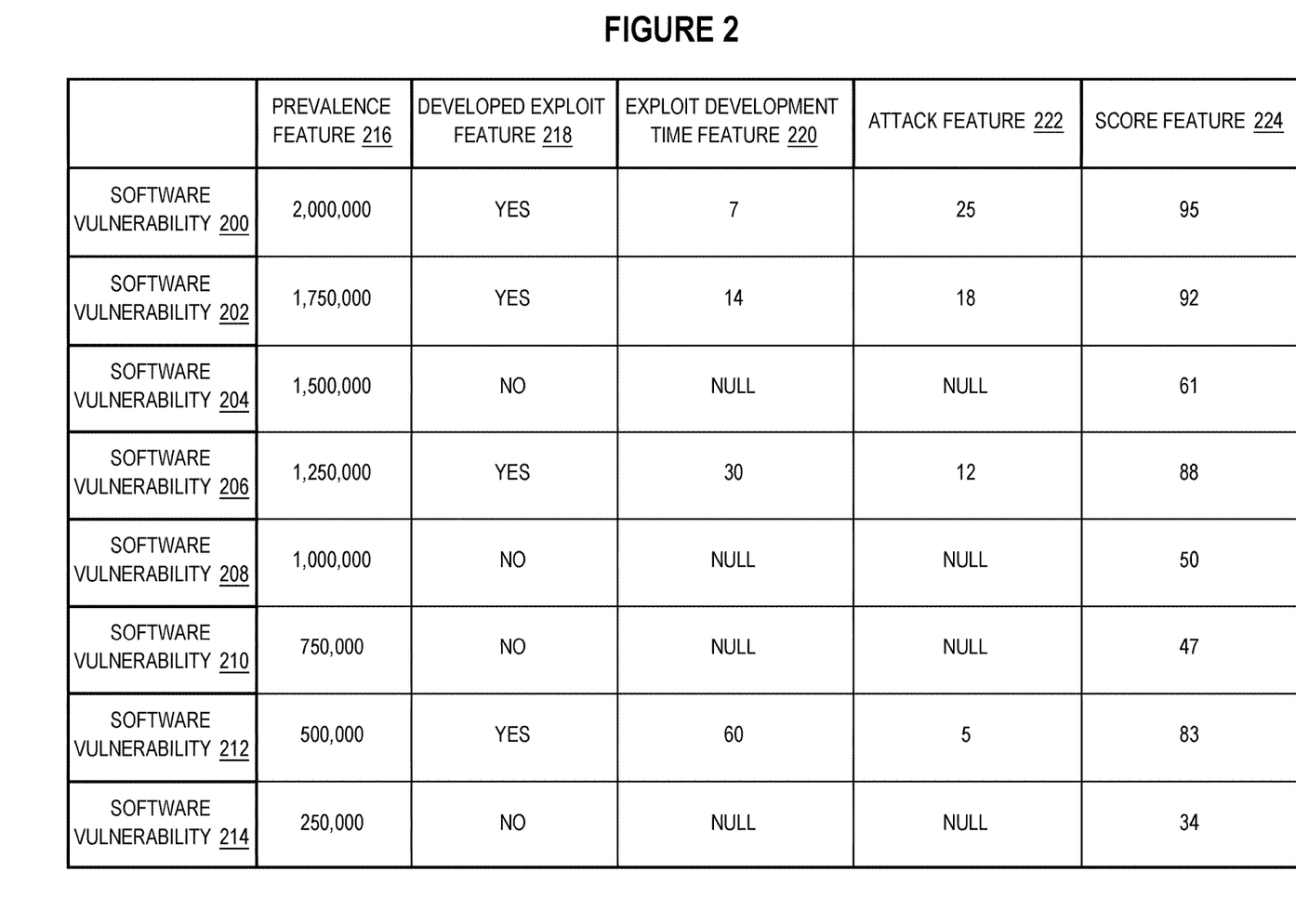
FIG. 2 is a table that depicts example features of software vulnerabilities.

Database(s) 104 may be implemented on any storage medium, including volatile or non-volatile storage media. Database(s) 104 store vulnerability data 120. FIG. 2 illustrates example vulnerability data 120. The vulnerability data may correlate a plurality of vulnerabilities with features of software vulnerabilities. In FIG. 2, example features 216-224 correspond to a plurality of software vulnerabilities 200-214. In the illustrated example, the features include prevalence feature 216 (how prevalent the software vulnerability is), developed exploit feature 218 (whether an exploit was developed for the software vulnerability), exploit development time feature 220 (amount of time taken to develop an exploit for the software vulnerability), attack feature 222 (whether an exploit for the software vulnerability was used in an attack), and score feature 224 (a score corresponding to the software vulnerability). Each software vulnerability corresponds to a respective set of feature values. For example, software vulnerability 200 has a value of "2,000, 000" for prevalence feature 216, indicating for example, that there have been 2,000,000 instances of software vulnerability 200; a value of "YES" for developed exploit feature 218, indicating that an exploit has been developed for software vulnerability 200; a value of 7 for exploit development time feature 220, indicating for example that an exploit for software vulnerability 200 was developed after 7 days; a value of "25 for attack feature 222, indicating for example that an exploit for software vulnerability 200 was used in 25 attacks; and a value of "95" for score feature 224, indicating a risk score of 95 for software vulnerability 200. For the purpose of illustrating a clear example, FIG. 2 depicts example features 216-224 as being organized in a structured format. However, some features may exist as unstructured data that may or may not undergo feature transformation to enable organization in a structured format. Non-limiting examples of feature transformation involve tokenization, n-grams, orthogonal sparse bigrams, quantile binning, normalization, and Cartesian products of multiple feature.

3.0 PROCESS OVERVIEW

FIG. 3 is a flow diagram that depicts an example approach for exploit prediction based on machine learning. In some embodiments, the approach is performed by risk assessment computer(s) 102.

At block 300, first training data is provided to one or more machine learning computers. The training data comprises one or more features for each software vulnerability in a training set. The one or more machine learning computers generate a first model for determining whether an exploit will be developed for a particular software vulnerability based on a plurality of features of the particular software vulnerability. Additionally or alternatively, the first model determines whether an exploit to be developed for a particular software vulnerability will be used in an attack.

In an embodiment, the first model determines a score, probability, or other data value that indicates a likelihood of whether an exploit will be developed for the particular software vulnerability and/or whether an exploit to be developed for a particular software vulnerability will be used in an attack. As an example, the first model may determine that, for a particular software vulnerability, there is a 35% chance that an exploit will be developed for the particular software vulnerability.

At block 302, the first model is applied to the first training data. Block 302 involves providing the first training data to one or more machine learning computers, which apply or execute the first model to generate predictions for each training instance in the first training set. Referring to the above example, the first model may determine that, for a particular training instance, there is a 35% chance that an exploit will be developed for the corresponding software vulnerability.

Based on the predictions generated by the first model, one or more training instances of the first training data are added to second training data. In an embodiment, the one or more training instances are added to second training data if they are predicted to be likely to have an exploit developed for the corresponding software vulnerability and/or an exploit to be developed for the corresponding software vulnerability will be used in an attack.

In some embodiments, the first model may indicate a 'Yes' or a 'No' as to whether an exploit will be developed and/or used in an attack. The training instance may be added to the second training data if the first model predicts a 'Yes' exploit and/or attack.

In other embodiments, the first model indicates a data value that indicates the likelihood, such as a percentage or a probability. The training instance may be added to the second training data if it exceeds a threshold value. Referring to the above example, the training instance may be added to the second training data if there is over 10% chance of an exploit and/or attack. The selected threshold value may be a different value depending on the embodiment. A threshold value may be selected to reduce the number of false positives and/or false negatives generated by the first model. The first model may be tuned such that the number of false positives and/or false negatives is under a threshold amount.

At block 304, the second training data is provided to the one or more machine learning computers. The second training data is a strict subset of the first training data. The one or more machine learning computers generate a second model for determining whether an exploit will be developed for a particular software vulnerability based on a plurality of features of the particular software vulnerability. Additionally or alternatively, the second model determines whether an exploit to be developed for a particular software vulnerability will be used in an attack. In an embodiment, the second model uses the same plurality of features as the first model. In other embodiments, the plurality of features is different than the first model. In an embodiment, the second model is trained to make the same type of determination as the first model. Additionally, the second model may generate the same type of output as the first model.

At block 306, first input data is provided to the one or more machine learning computers. The input data comprises one or more features for a plurality of software vulnerabilities that do not yet have an exploit developed for them. Thus, the one or more machine learning computers apply the first model to generate predictions for the input data based on the one or more features. The predictions indicate whether and/or when an exploit will be developed for each software vulnerability of the plurality of software vulnerabilities.

At block 308, the one or more machine learning computers return output data indicating a prediction of whether an exploit will be developed for each software vulnerability of the plurality of software vulnerabilities. For example, referring to FIG. 2, the output data may comprise a predicted value for the developed exploit feature 218, i.e., whether an exploit is likely to be developed, and/or a predicted value of the exploit development time feature 220, i.e., an amount of time taken to develop an exploit, for each software vulnerability of the plurality of software vulnerabilities.

Based on the predictions generated by the first model, one or more software vulnerabilities of the plurality of software vulnerabilities are added to second input data. In an embodiment, a software vulnerability is added to the second input data if it is predicted to be likely to have an exploit developed and/or predicted to be likely to have an exploit used in an attack.

In some embodiments, the first model may indicate a 'Yes' or a 'No' as to whether an exploit will be developed and/or used in an attack. The software vulnerability may be added to the second input data if the first model predicts a 'Yes' exploit and/or attack.

In other embodiments, the first model indicates a data value that indicates the likelihood, such as a percentage or a probability. The software vulnerability may be added to the second input data if it exceeds a threshold value. The selected threshold value may be a different value depending on the embodiment. A threshold value may be selected to reduce the number of false positives and/or false negatives generated by the second model. The second model may be tuned such that the number of false positives and/or false negatives is under a threshold amount.

Additionally, the selected threshold value may be different from the threshold value used for selecting the second training data. The first model may be tuned to reduce the number of false positives and the second model may be tuned to reduce the number of false negatives, or vice versa.

At block 310, the second input data is provided to the one or more machine learning computers. The second input data is a strict subset of the first input data. The one or more machine learning computers apply the second model to generate predictions for the second input data based on the one or more features of the second model. The predictions indicate whether and/or when an exploit will be developed for each software vulnerability of the plurality of software vulnerabilities.

At block 312, the one or more machine learning computers return output data indicating a prediction of whether, according to the second model, an exploit will be developed for each software vulnerability of the plurality of software vulnerabilities. For example, the output data may comprise predicted values of a developed exploit feature/developed exploit time feature for each software vulnerability of the plurality of software vulnerabilities.

In an embodiment, a first and second model determine whether an exploit will be developed for each software vulnerability of a plurality of software vulnerabilities, and a third and fourth model determine whether an exploit to be developed for the software vulnerability will be used in an attack. A subset of the first and/or second input data may be provided to the one or more machine learning computers. The subset may be limited to software vulnerabilities that are predicted to have exploits developed for them. Determination of the subset of the input data may be based on the output data of block 308 and/or block 312. More specifically, the subset of the input data may be limited to software vulnerabilities that correspond to a subset of the output data of block 308 and/or block 312. The subset of the output data may include software vulnerabilities that are predicted, based on the first and/or second model, to have exploits developed for them.

Accordingly, the one or more machine learning computers apply the third model to generate a prediction for each software vulnerability included in the subset of the plurality of software vulnerabilities. The prediction indicates whether an exploit to be developed for the software vulnerability will be used in an attack.

Additionally, based on the predictions generated by the third model, a subset of the software vulnerabilities is provided to the one or more machine learning computers for applying the fourth model. In an embodiment, one or more software vulnerabilities of the subset are selected if an exploit to be developed for the corresponding software vulnerability is predicted to be used in an attack.

In some embodiments, the output data of the models discussed above are used to adjust a risk score for one or more software vulnerabilities. Risk scores may be used to prioritize remediation of software vulnerabilities. For example, remediation may be prioritized in the following order: (1) software vulnerabilities predicted to have exploits developed for them, where the exploits are predicted to be used in attacks; (2) software vulnerabilities predicted to have exploits developed for them, where the exploits are predicted not to be used in attacks; and (3) software vulnerabilities predicted not to have exploits developed for them. Furthermore, software vulnerabilities predicted to have exploits developed for them may be prioritized according to when exploits are predicted to be developed and/or when attacks are predicted to occur.

The multi-stage machine training (and application) of machine learning models described herein provides several benefits. One example is the ability to train a machine learning model using a more precise set of test data. This may be particularly useful when events are rare, or in unbalanced datasets where down sampling is necessary to limit overfitting. Typically, the number of software vulnerabilities that will have exploits developed for them is low relative to the overall number of software vulnerabilities. Thus, the training data may include a large number of software vulnerabilities that result in a 'no' determination, and a smaller number that result in a 'yes' determination.

When the first machine learning model is applied to the training data set, a subset of the training data is selected based on the output of the first machine learning model. The subset includes software vulnerabilities that the first model determined were at least likely to have exploits relative to other software vulnerabilities. In other words, training data that the first model determined will not (or are relatively unlikely to) have exploits are filtered out. The second machine learning model is trained on the subset of training data, which has a higher percentage of software vulnerabilities that might have exploits. Thus, the second machine learning model is trained on more precise training data. The two (or more) stage approach yields more accurate results than if the training data was filtered manually (i.e., not using the first machine learning model).

In addition, the techniques described above may be applied to areas other than software vulnerabilities and exploits. The techniques may be used in any situation where a binary decision (e.g., yes or no) is desired, and one option has a greater number of results than the other.

5.0 HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
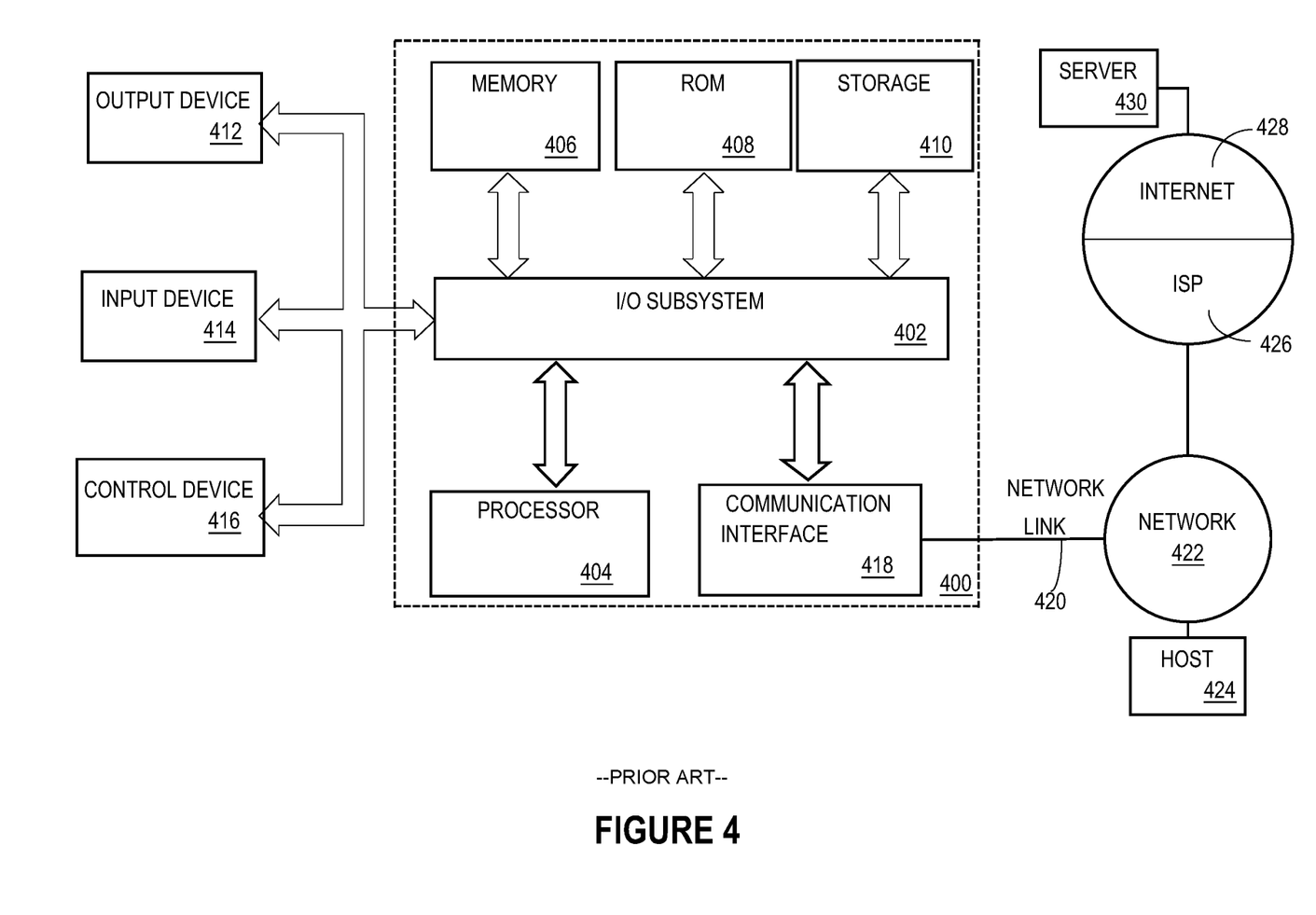
FIG. 4 is a block diagram that depicts a computer system on which embodiments may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens; microphones; still and video digital cameras; alphanumeric and other keys; keypads; keyboards;

graphics tablets; image scanners; joysticks; clocks; switches; buttons; dials; slides; and/or various types of sensors such as force sensors, motion sensors, heat sensors, accelerometers, gyroscopes, inertial measurement unit (IMU) sensors; and/or various types of transceivers such as wireless (e.g. cellular or Wi-Fi™ technology) transceivers, radio frequency (RF) transceivers, infrared (IR) transceivers, and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), which allow the input device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402, for example, by placing the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi™, or BLUETOOTH® technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as the DOCKER™ computer software or the KUBERNETES® container system. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   storage media;
   one or more processors; and
   one or more programs stored in the storage media and configured for execution by the one or more processors, the one or more programs comprising instructions for:
      storing a first prediction model that has been trained based on first training data, wherein the first prediction model enables determining a likelihood of whether exploits will be developed for software vulnerabilities;
      storing a second prediction model that has been trained based on second training data consisting of training instances of said first training data which, when used to compute a corresponding score through the first prediction model, produced a score greater than a first threshold value, wherein the second prediction model enables determining a likelihood of whether exploits will be developed for software vulnerabilities;
      receiving input data identifying a particular software vulnerability; and
      using the second prediction model, computing a likelihood of whether exploits will be developed for the particular software vulnerability.

2. The system of claim 1, wherein for each training instance, the corresponding score indicates a likelihood that an exploit will be developed for a software vulnerability corresponding to said each training instance.

3. The system of claim 2, wherein scores below the first threshold value indicate that it is unlikely that an exploit will be developed for a software vulnerability.

4. The system of claim 1, wherein the one or more programs further comprise instructions for:
   causing application of the first prediction model to first input data that corresponds to a first plurality of software vulnerabilities, wherein each software vulnerability of the first plurality of software vulnerabilities has yet to have an exploit developed for said each software vulnerability;

receiving, based on the application of the first prediction model to the first input data, first output data that indicates, for each software vulnerability of the first plurality of software vulnerabilities, a prediction of whether an exploit will be developed for said each software vulnerability;

for each prediction indicated in the first output data, adding, to second input data, a software vulnerability corresponding to said each prediction only if said each prediction is above a second threshold value;

causing application of the second prediction model to the second input data; and receiving, based on the application of the second prediction model to the second input data, second output data that indicates, for each software vulnerability in the second plurality of software vulnerabilities, a prediction of whether an exploit will be developed for said each software vulnerability.

5. The system of claim 4, wherein the first threshold value is different from the second threshold value.

6. The system of claim 4, wherein the one or more programs further comprise instructions for:

storing a third prediction model that has been trained based on third training data, wherein the third training data is a subset of the first training data, and wherein each training instance of the third training data is predicted to have an exploit developed, wherein the third prediction model enables determining a likelihood of whether exploits that have yet to be developed will be used in an attack; and storing a fourth prediction model that has been trained based on fourth training data consisting of training instances of said third training data which, when used to compute a corresponding score through the third prediction model, produced a score greater than a third threshold value, wherein the fourth prediction model enables determining a likelihood of whether exploits that have yet to be developed will be used in an attack.

7. The system of claim 6, wherein the one or more programs further comprise instructions for:

causing application of the third prediction model to third input data that corresponds to a third plurality of software vulnerabilities, wherein the third plurality of software vulnerabilities is a subset of the second plurality of software vulnerabilities, and wherein each software vulnerability of the third plurality of software vulnerabilities is predicted to have an exploit developed for said each software vulnerability of the third plurality of software vulnerabilities;

receiving, based on the application of the third prediction model to the third input data, third output data that indicates, for each software vulnerability of the third plurality of software vulnerabilities, a first prediction of whether a corresponding exploit that is predicted to be developed for said each software vulnerability is also predicted to be used in an attack;

causing application of the fourth prediction model to fourth input data that corresponds to a fourth plurality of software vulnerabilities, wherein the fourth plurality of software vulnerabilities is determined based on removing, from the third input data, data that corresponds to a subset of the third plurality of software vulnerabilities, wherein each software vulnerability in the subset of the third plurality of software vulnerabilities is predicted to have an exploit developed for said each software vulnerability in the subset, and wherein the corresponding exploit that is predicted to be developed for said each software vulnerability in the subset is predicted not to be used in an attack; and receiving, based on the application of the fourth prediction model to the fourth input data, fourth output data that indicates, for each software vulnerability in the fourth plurality of software vulnerabilities, a second prediction of whether the corresponding exploit that is predicted to be developed for said each software vulnerability is also predicted to be used in an attack.

8. A system comprising:

storage media;

one or more processors; and one or more programs stored in the storage media and configured for execution by the one or more processors, the one or more programs comprising instructions for:

storing a first prediction model that has been trained based on first training data, wherein the first prediction model enables determining a likelihood of whether exploits to be developed for software vulnerabilities will be used in an attack;

storing a second prediction model that has been trained based on second training data consisting of training instances of said first training data which, when used to compute a corresponding score through the first prediction model, produced a score greater than a first threshold value, wherein the second prediction model enables determining a likelihood of whether exploits to be developed for software vulnerabilities will be used in an attack;

receiving input data identifying a particular software vulnerability; and using the second prediction model, computing a likelihood of whether exploits to be developed for the particular software vulnerability will be used in an attack.

9. The system of claim 8, wherein the one or more programs further comprise instructions for:

causing application of the first prediction model to first input data that corresponds to a first plurality of software vulnerabilities, wherein each software vulnerability of the first plurality of software vulnerabilities has yet to have an exploit developed for said each software vulnerability;

receiving, based on the application of the first prediction model to the first input data, first output data that indicates, for each software vulnerability of the first plurality of software vulnerabilities, a prediction of whether an exploit to be developed for said each software vulnerability will be used in an attack;

for each prediction indicated in the first output data, adding, to second input data, a software vulnerability corresponding to said each prediction only if said each prediction is above a second threshold value;

causing application of the second prediction model to the second input data; and receiving, based on the application of the second prediction model to the second input data, second output data that indicates, for each software vulnerability in the second plurality of software vulnerabilities, a prediction of whether an exploit to be developed for said each software vulnerability will be used in an attack.

10. A method comprising:

storing a first prediction model that has been trained based on first training data, wherein the first prediction model enables determining a likelihood of whether exploits will be developed for software vulnerabilities;

storing a second prediction model that has been trained based on second training data consisting of training instances of said first training data which, when used to compute a corresponding score through the first prediction model, produced a score greater than a first threshold value, wherein the second prediction model enables determining a likelihood of whether exploits will be developed for software vulnerabilities;

receiving input data identifying a particular software vulnerability; and using the second prediction model, computing a likelihood of whether exploits will be developed for the particular software vulnerability.

11. The method of claim 10, wherein for each training instance, the corresponding score indicates a likelihood that an exploit will be developed for a software vulnerability corresponding to said each training instance.

12. The method of claim 11, wherein the first threshold value is a minimum score for which it is likely that an exploit will be developed for the software vulnerability corresponding to said each training instance.

13. The method of claim 10, further comprising:

causing application of the first prediction model to first input data that corresponds to a first plurality of software vulnerabilities, wherein each software vulnerability of the first plurality of software vulnerabilities has yet to have an exploit developed for said each software vulnerability;

receiving, based on the application of the first prediction model to the first input data, first output data that indicates, for each software vulnerability of the first plurality of software vulnerabilities, a prediction of whether an exploit will be developed for said each software vulnerability;

for each prediction indicated in the first output data, adding, to second input data, a software vulnerability corresponding to said each prediction only if said each prediction is above a second threshold value;

causing application of the second prediction model to the second input data; and receiving, based on the application of the second prediction model to the second input data, second output data that indicates, for each software vulnerability in the second plurality of software vulnerabilities, a prediction of whether an exploit will be developed for said each software vulnerability.

14. The method of claim 13, wherein the first threshold value is different from the second threshold value.

15. The method of claim 13, further comprising:

storing a third prediction model that has been trained based on third training data, wherein the third training data is a subset of the first training data, and wherein each training instance of the third training data is predicted to have an exploit developed, wherein the third prediction model enables determining a likelihood of whether exploits that have yet to be developed will be used in an attack; and storing a fourth prediction model that has been trained based on fourth training data consisting of training instances of said third training data which, when used to compute a corresponding score through the third prediction model, produced a score greater than a third threshold value, wherein the fourth prediction model enables determining a likelihood of whether exploits that have yet to be developed will be used in an attack.

16. The method of claim 15, further comprising:

causing application of the third prediction model to third input data that corresponds to a third plurality of software vulnerabilities, wherein the third plurality of software vulnerabilities is a subset of the second plurality of software vulnerabilities, and wherein each software vulnerability of the third plurality of software vulnerabilities is predicted to have an exploit developed for said each software vulnerability of the third plurality of software vulnerabilities;

receiving, based on the application of the third prediction model to the third input data, third output data that indicates, for each software vulnerability of the third plurality of software vulnerabilities, a first prediction of whether a corresponding exploit that is predicted to be developed for said each software vulnerability is also predicted to be used in an attack;

causing application of the fourth prediction model to fourth input data that corresponds to a fourth plurality of software vulnerabilities, wherein the fourth plurality of software vulnerabilities is determined based on removing, from the third input data, data that corresponds to a subset of the third plurality of software vulnerabilities, wherein each software vulnerability in the subset of the third plurality of software vulnerabilities is predicted to have an exploit developed for said each software vulnerability in the subset, and wherein the corresponding exploit that is predicted to be developed for said each software vulnerability in the subset is predicted not to be used in an attack; and receiving, based on the application of the fourth prediction model to the fourth input data, fourth output data that indicates, for each software vulnerability in the fourth plurality of software vulnerabilities, a second prediction of whether the corresponding exploit that is predicted to be developed for said each software vulnerability is also predicted to be used in an attack.

17. A method comprising:

storing a first prediction model that has been trained based on first training data, wherein the first prediction model enables determining a likelihood of whether exploits to be developed for software vulnerabilities will be used in an attack;

storing a second prediction model that has been trained based on second training data consisting of training instances of said first training data which, when used to compute a corresponding score through the first prediction model, produced a score greater than a first threshold value, wherein the second prediction model enables determining a likelihood of whether exploits to be developed for software vulnerabilities will be used in an attack;

receiving input data identifying a particular software vulnerability; and using the second prediction model, computing a likelihood of whether exploits to be developed for the particular software vulnerability will be used in an attack.

18. The method of claim 17, further comprising:

causing application of the first prediction model to first input data that corresponds to a first plurality of software vulnerabilities, wherein each software vulnerability of the first plurality of software vulnerabilities has yet to have an exploit developed for said each software vulnerability;

receiving, based on the application of the first prediction model to the first input data, first output data that indicates, for each software vulnerability of the first plurality of software vulnerabilities, a prediction of whether an exploit to be developed for said each software vulnerability will be used in an attack;

for each prediction indicated in the first output data, adding, to second input data, a software vulnerability corresponding to said each prediction only if said each prediction is above a second threshold value;

causing application of the second prediction model to the second input data; and receiving, based on the application of the second prediction model to the second input data, second output data that indicates, for each software vulnerability in the second plurality of software vulnerabilities, a prediction of whether an exploit to be developed for said each software vulnerability will be used in an attack.

\* \* \* \* \*